US012198267B1

(12) United States Patent
Nagy

(10) Patent No.: US 12,198,267 B1
(45) Date of Patent: Jan. 14, 2025

(54) GENERATING A SHADOW BASED ON A SPHERICAL GAUSSIAN LOBE

(71) Applicant: Gabor Nagy, San Mateo, CA (US)

(72) Inventor: Gabor Nagy, San Mateo, CA (US)

(73) Assignee: APPLE INC., Cupertino, CA (US)

( * ) Notice: Subject to any disclaimer, the term of this patent is extended or adjusted under 35 U.S.C. 154(b) by 479 days.

(21) Appl. No.: 17/702,011

(22) Filed: Mar. 23, 2022

Related U.S. Application Data

(60) Provisional application No. 63/188,260, filed on May 13, 2021.

(51) Int. Cl.
*G06T 15/60* (2006.01)
*G06T 15/06* (2011.01)

(52) U.S. Cl.
CPC .............. *G06T 15/60* (2013.01); *G06T 15/06* (2013.01)

(58) Field of Classification Search
CPC ................................. G06T 15/60; G06T 15/06
See application file for complete search history.

(56) References Cited

U.S. PATENT DOCUMENTS

| | | | |
|---|---|---|---|
| 9,626,794 B2 | 4/2017 | Tokuyoshi | |
| 10,679,046 B1* | 6/2020 | Black | G06V 40/23 |
| 2009/0115784 A1* | 5/2009 | Tomite | G06T 15/06 |
| | | | 345/426 |
| 2016/0005217 A1* | 1/2016 | Tokuyoshi | G06T 15/506 |
| | | | 345/426 |
| 2021/0065440 A1 | 3/2021 | Sunkavalli et al. | |
| 2021/0090338 A1* | 3/2021 | Chen | G06F 3/0304 |
| 2021/0279948 A1* | 9/2021 | Hou | G06T 15/04 |
| 2023/0140460 A1* | 5/2023 | Munkberg | G06N 3/045 |
| | | | 345/423 |

FOREIGN PATENT DOCUMENTS

WO     2018046398 A1     3/2018

OTHER PUBLICATIONS

Legendre et al., Learning Illumination from Diverse Portraits, pp. 1-14 (Year: 2020).*

(Continued)

*Primary Examiner* — Phuc N Doan
(74) *Attorney, Agent, or Firm* — Fernando & Partners, LLP

(57) ABSTRACT

A method is performed at an electronic device including one or more processors and a non-transitory memory. The method includes obtaining a first spherical Gaussian (SG) lobe that characterizes ambient light from a physical environment. The method may include determining the first SG lobe based on a 360 degree image of the physical environment. The first SG lobe indicates a first directional characteristic associated with the ambient light. The method includes determining a first plurality of sampling rays based on the first directional characteristic. The method includes obtaining a depth value that is associated with a computer-generated object. The depth value may be from a depth buffer, which is populated with the depth value during rendering of the computer-generated object. The method includes generating a shadow that is associated with the computer-generated object, based on the depth value and a first sampling ray of the first plurality of sampling rays.

21 Claims, 13 Drawing Sheets

(56) References Cited

OTHER PUBLICATIONS

The Danger Zone, Approximating Subsurface Scattering With Spherical Gaussians, URL: https://therealmjp.github.io/posts/sss-sg/, Feb. 9, 2020 (Year: 2020).*

The Danger Zone, SG Series Part 2: Spherical Gaussians 101, URL: https://mynameismjp.wordpress.com/2016/10/09/sg-series-part-2-spherical-gaussians-101/, Oct. 10, 2016 (Year: 2016).*

Wang et al., All-frequency rendering of dynamic, spatially-varying reflectance, URL: https://dl.acm.org/doi/10.1145/1618452.1618479, 2009 (Year: 2009).*

Yusuke Tokuyoshi, Virtual Spherical Gaussian Lights for Real-time Glossy Indirect Illumination, Pacific Graphics 2015 (Year: 2015).*

Currius et al. (Spherical Gaussian Light-field Textures for Fast Precomputed Global Illumination), DOI: 10.1111/cgf.13918, 2020 (Year: 2020).*

Kun Xu et al., Anisotropic Spherical Gaussians, ACM Transactions on Graphics (TOG), vol. 32, Issue 6 Article No. 209, pp. 1-11, https://doi.org/10.1145/2508363.2508386 (Year: 2013).*

Furuya et al. "Efficient Calculation Method of Spherical Signed Distance Function for Real-time Rendering of Dynamic Scenes", SIGGRAPH Asia, 2011, 2 pages.

* cited by examiner

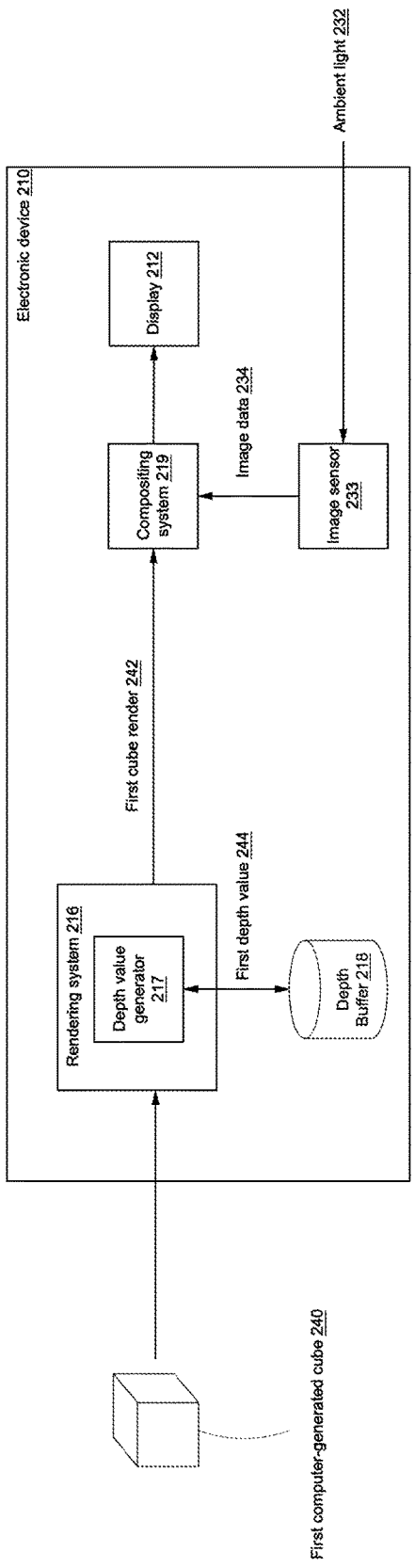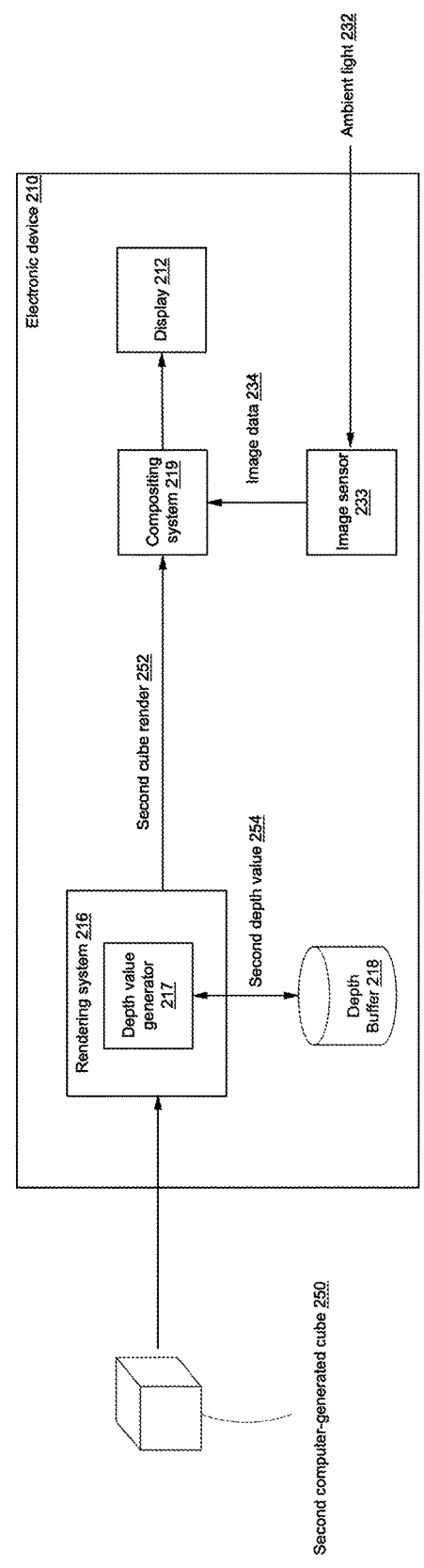
Figure 2B
Figure 2C

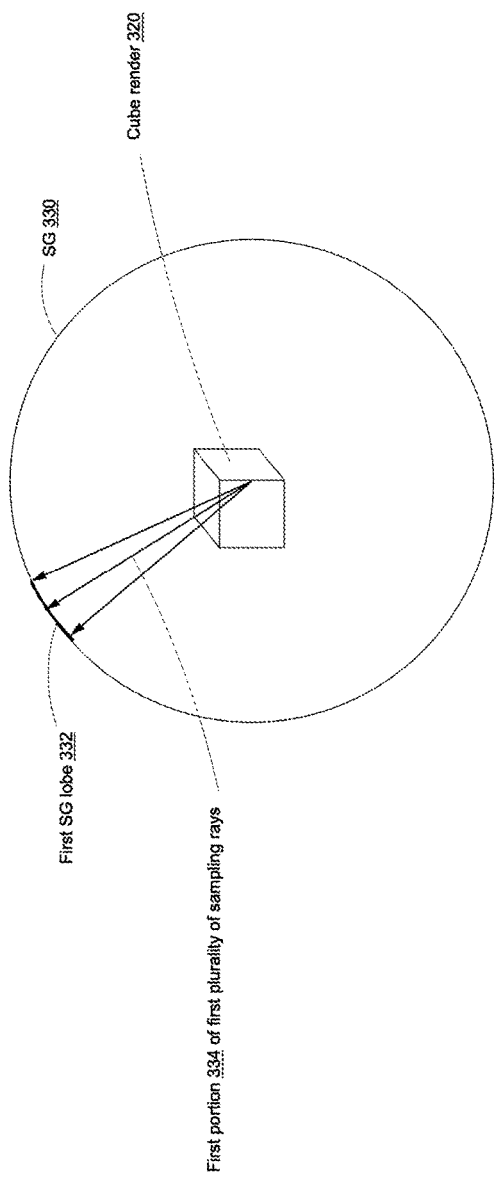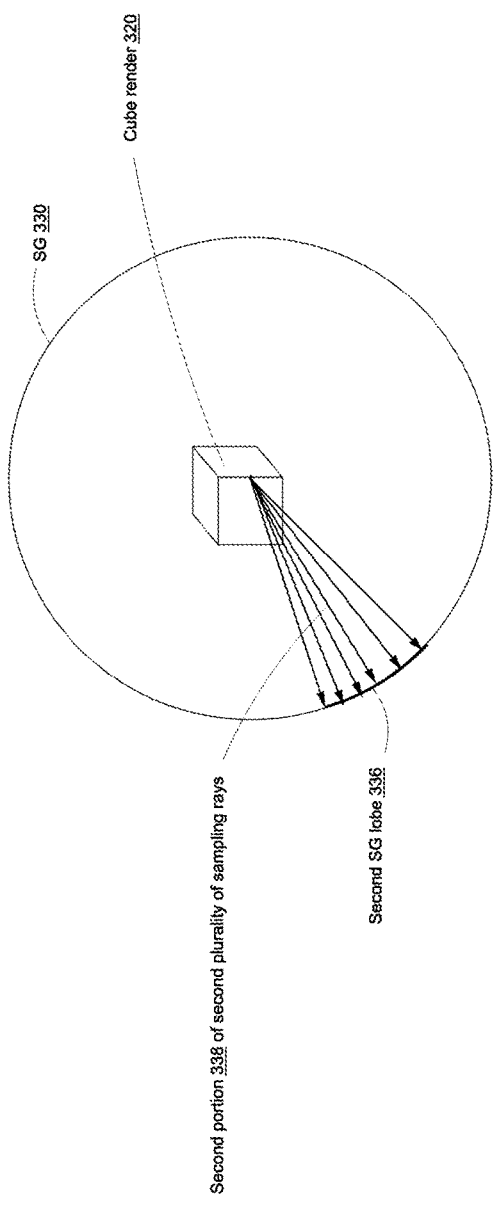
Figure 3B
Figure 3C

GENERATING A SHADOW BASED ON A SPHERICAL GAUSSIAN LOBE

CROSS-REFERENCE TO RELATED APPLICATIONS

This application claims priority to U.S. Provisional Patent App. No. 63/188,260 filed on May 13, 2021, and hereby incorporated by reference in its entirety.

TECHNICAL FIELD

The present disclosure relates to generating shadows, and in particular generating a shadow associated with a computer-generated object.

BACKGROUND

Previously available techniques for generating shadows are often inaccurate and computationally expensive. For example, some techniques include generating a three-dimensional (3D) mesh for a computer-generated object, and tracing light rays against the mesh in order to determine a shadow for the computer-generated object. However, determining the shadow based on the 3D mesh is computationally expensive. As another example, some techniques include arbitrarily sampling across a plurality of directions, and tracing a light ray across the plurality of directions in order to determine a shadow, resulting in shadow inaccuracies and high system resource utilization.

SUMMARY

In accordance with some implementations, a method is performed at an electronic device with one or more processors and a non-transitory memory. The method includes obtaining a first spherical Gaussian (SG) lobe that characterizes ambient light from a physical environment. The first SG lobe indicates a first directional characteristic associated with the ambient light. The method includes determining a first plurality of sampling rays based on the first directional characteristic. The method includes obtaining a depth value that is associated with a computer-generated object. The method includes generating a shadow that is associated with the computer-generated object, based on the depth value and a first sampling ray of the first plurality of sampling rays.

In accordance with some implementations, an electronic device includes one or more processors and a non-transitory memory. The one or more programs are stored in the non-transitory memory and configured to be executed by the one or more processors and the one or more programs include instructions for performing or causing performance of the operations of any of the methods described herein. In accordance with some implementations, a non-transitory computer readable storage medium has stored therein instructions which when executed by one or more processors of an electronic device, cause the device to perform or cause performance of the operations of any of the methods described herein. In accordance with some implementations, an electronic device includes means for performing or causing performance of the operations of any of the methods described herein. In accordance with some implementations, an information processing apparatus, for use in an electronic device, includes means for performing or causing performance of the operations of any of the methods described herein.

BRIEF DESCRIPTION OF THE DRAWINGS

For a better understanding of the various described implementations, reference should be made to the Description, below, in conjunction with the following drawings in which like reference numerals refer to corresponding parts throughout the figures.

FIGS. 2A-2I are an example of generating shadows based on respective depth values and an SG lobe in accordance with some implementations.

FIGS. 3A-3D are an example of utilizing a plurality of SG lobes for generating different shadows in accordance with some implementations.

DESCRIPTION OF IMPLEMENTATIONS

Figure 1:
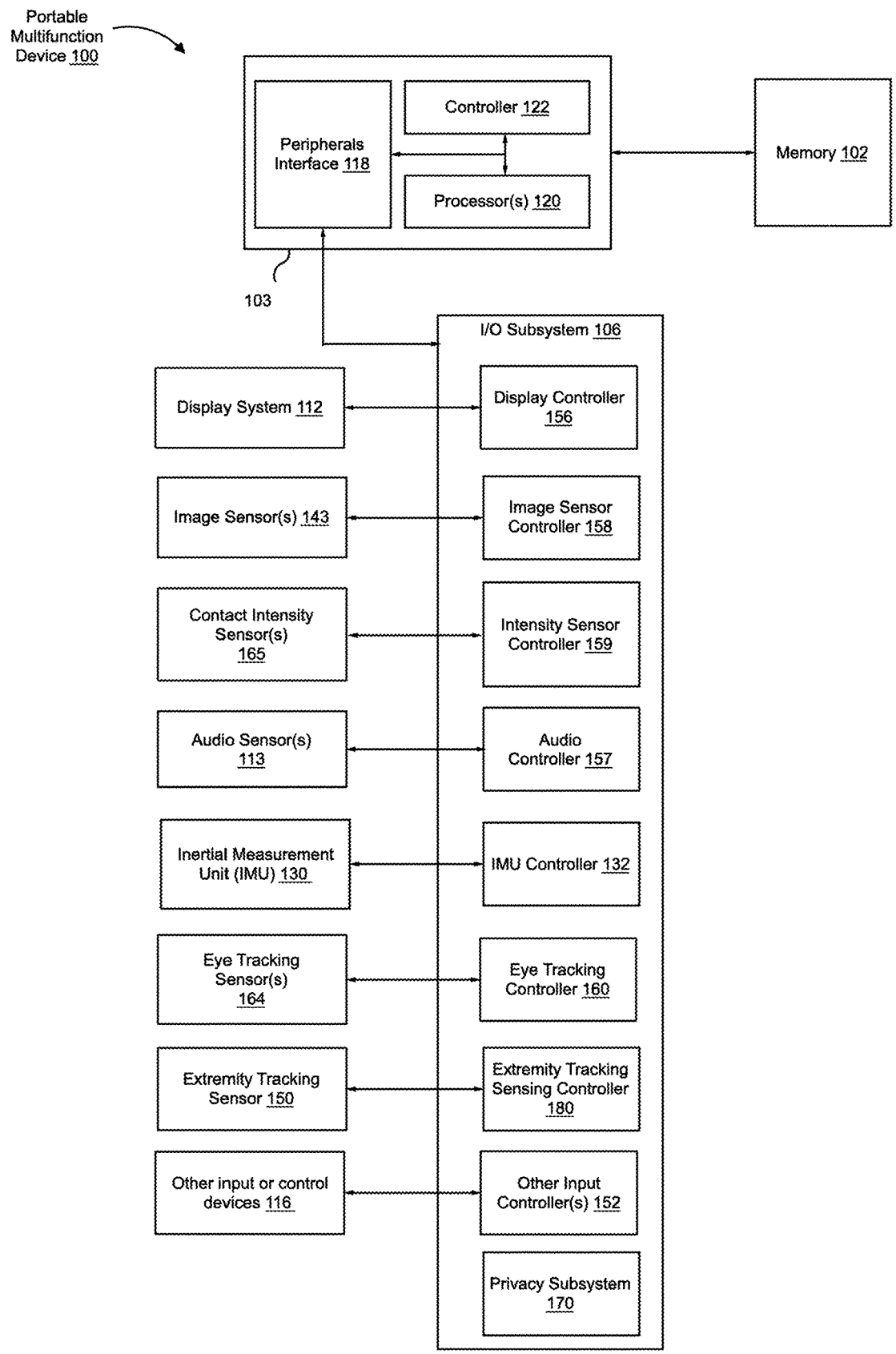
FIG. 1 is a block diagram of an example of a portable multifunction device in accordance with some implementations.

Techniques for generating shadows are often inaccurate and computationally expensive. For example, one technique includes generating a three-dimensional (3D) mesh indicating a depth value, and tracing a light ray against the 3D mesh in order to determine a shadow based on the depth value. However, determining the shadow based on the 3D mesh is computationally expensive. For example, it is computationally expensive to test shadow rays against potentially thousands or millions of triangles in the 3D mesh. As another example, one technique includes arbitrarily sampling across a plurality of directions, and tracing a light ray across the plurality of directions in order to determine a shadow. Accordingly, determining the shadow based on the particular light ray includes a relatively large number of calculations, resulting in a high level of processor utilization.

By contrast, various implementations include methods, systems, and electronic devices that generate a shadow for a computer-generated object based on a depth value and a spherical Gaussian (SG) lobe. The SG lobe characterizes ambient light from a physical environment, such as light generated by a physical desk lamp or by the Sun. As used herein, "ambient light" may refer to light produced by direct or indirect light sources. The SG indicates a directional characteristic associated with the ambient light. In some implementations, a method includes determining the SG lobe based on a 360 degree image of the physical environment. For example, a neural network receives the 360 degree image and outputs a corresponding SG lobe. The method includes determining a plurality of sampling rays based on the directional characteristic. For example, each of the plurality of sampling rays is substantially parallel to the SG lobe. In some implementations, the method includes obtaining a plurality of SG lobes, and determines a plurality of sampling rays for each of the plurality of SG lobes. For example, in some implementations, ambient light from a physical environment includes light from multiple physical light sources (e.g., a street lamp, the Sun, etc.), and each of the multiple physical light sources is characterized by one or more SG lobes. Moreover, the method includes obtaining a depth value that is associated with a computer-generated object. To that end, in some implementations, the method includes generating the depth value during rendering the computer-generated object, and storing the depth value in a depth buffer for subsequent retrieval. For example, a rendering system, which may be integrated in a graphics processing unit (GPU), renders the computer-generated object. Thus, in contrast to other techniques, the method foregoes generating a 3D mesh of the environment, instead utilizing the depth value that is determined during rendering of the computer-generated object, thereby reducing resource utilization. Based on the depth value and at least one of the plurality of sampling rays, the method includes generating a shadow that is associated with the computer-generated object. In some implementations, generating the shadow includes tracing a sampling ray against the depth value. Accordingly, in contrast to other techniques that include tracing light rays in arbitrary directions, the method includes tracing the sampling ray based on a directional characteristic associated with the ambient light. Accordingly, the method includes generating a more accurate shadow for a computer-generated object, while using less system resources.

DESCRIPTION

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described implementations. The first contact and the second contact are both contacts, but they are not the same contact, unless the context clearly indicates otherwise.

The terminology used in the description of the various described implementations herein is for the purpose of describing particular implementations only and is not intended to be limiting. As used in the description of the various described implementations and the appended claims, the singular forms "a", "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including", "comprises", and/or "comprising", when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting", depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]", depending on the context.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina.

Projection systems also may be configured to project virtual objects into the physical environment, for example, as a hologram or on a physical surface.

FIG. 1 is a block diagram of an example of a portable multifunction device 100 (sometimes also referred to herein as the "electronic device 100" for the sake of brevity) in accordance with some implementations. The electronic device 100 includes memory 102 (e.g., one or more non-transitory computer readable storage mediums), a memory controller 122, one or more processing units (CPUs) 120, a peripherals interface 118, an input/output (I/O) subsystem 106, a display system 112, an inertial measurement unit (IMU) 130, image sensor(s) 143 (e.g., camera), contact intensity sensor(s) 165, audio sensor(s) 113 (e.g., microphone), eye tracking sensor(s) 164 (e.g., included within a head-mountable device (HMD)), an extremity tracking sensor 150, and other input or control device(s) 116. In some implementations, the electronic device 100 corresponds to one of a mobile phone, tablet, laptop, wearable computing device, head-mountable device (HMD), head-mountable enclosure (e.g., the electronic device 100 slides into or otherwise attaches to a head-mountable enclosure), or the like. In some implementations, the head-mountable enclosure is shaped to form a receptacle for receiving the electronic device 100 with a display.

In some implementations, the peripherals interface 118, the one or more processing units 120, and the memory controller 122 are, optionally, implemented on a single chip, such as a chip 103. In some other implementations, they are, optionally, implemented on separate chips.

The I/O subsystem 106 couples input/output peripherals on the electronic device 100, such as the display system 112 and the other input or control devices 116, with the peripherals interface 118. The I/O subsystem 106 optionally includes a display controller 156, an image sensor controller 158, an intensity sensor controller 159, an audio controller 157, an eye tracking controller 160, one or more input controllers 152 for other input or control devices, an IMU controller 132, an extremity tracking controller 180, and a privacy subsystem 170. The one or more input controllers 152 receive/send electrical signals from/to the other input or control devices 116. The other input or control devices 116 optionally include physical buttons (e.g., push buttons, rocker buttons, etc.), dials, slider switches, joysticks, click wheels, and so forth. In some alternate implementations, the one or more input controllers 152 are, optionally, coupled with any (or none) of the following: a keyboard, infrared port, Universal Serial Bus (USB) port, stylus, finger-wearable device, and/or a pointer device such as a mouse. The one or more buttons optionally include a push button. In some implementations, the other input or control devices 116 includes a positional system (e.g., GPS) that obtains information concerning the location and/or orientation of the electronic device 100 relative to a particular object. In some implementations, the other input or control devices 116 include a depth sensor and/or a time-of-flight sensor that obtains depth information characterizing a physical object within a physical environment. In some implementations, the other input or control devices 116 include an ambient light sensor that senses ambient light from a physical environment and outputs corresponding ambient light data.

The display system 112 provides an input interface and an output interface between the electronic device 100 and a user. The display controller 156 receives and/or sends electrical signals from/to the display system 112. The display system 112 displays visual output to the user. The visual output optionally includes graphics, text, icons, video, and any combination thereof (sometimes referred to herein as "computer-generated content"). In some implementations, some or all of the visual output corresponds to user interface objects. As used herein, the term "affordance" refers to a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

The display system 112 may have a touch-sensitive surface, sensor, or set of sensors that accepts input from the user based on haptic and/or tactile contact. The display system 112 and the display controller 156 (along with any associated modules and/or sets of instructions in the memory 102) detect contact (and any movement or breaking of the contact) on the display system 112 and converts the detected contact into interaction with user-interface objects (e.g., one or more soft keys, icons, web pages or images) that are displayed on the display system 112. In an example implementation, a point of contact between the display system 112 and the user corresponds to a finger of the user or a finger-wearable device.

The display system 112 optionally uses LCD (liquid crystal display) technology, LPD (light emitting polymer display) technology, or LED (light emitting diode) technology, although other display technologies are used in other implementations. The display system 112 and the display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with the display system 112.

The user optionally makes contact with the display system 112 using any suitable object or appendage, such as a stylus, a finger-wearable device, a finger, and so forth. In some implementations, the user interface is designed to work with finger-based contacts and gestures, which can be less precise than stylus-based input due to the larger area of contact of a finger on the touch screen. In some implementations, the electronic device 100 translates the rough finger-based input into a precise pointer/cursor position or command for performing the actions desired by the user.

Audio circuitry also receives electrical signals converted by the audio sensors 113 (e.g., a microphone) from sound waves. Audio circuitry converts the electrical signal to audio data and transmits the audio data to the peripherals interface 118 for processing. Audio data is, optionally, retrieved from and/or transmitted to the memory 102 and/or RF circuitry by the peripherals interface 118. In some implementations, audio circuitry also includes a headset jack. The headset jack provides an interface between audio circuitry and removable audio input/output peripherals, such as output-only headphones or a headset with both output (e.g., a headphone for one or both ears) and input (e.g., a microphone).

The inertial measurement unit (IMU) 130 includes accelerometers, gyroscopes, and/or magnetometers in order measure various forces, angular rates, and/or magnetic field information with respect to the electronic device 100. Accordingly, according to various implementations, the IMU 130 detects one or more positional change inputs of the electronic device 100, such as the electronic device 100 being shaken, rotated, moved in a particular direction, and/or the like.

The image sensor(s) 143 capture still images and/or video. In some implementations, an image sensor 143 is located on the back of the electronic device 100, opposite a touch screen on the front of the electronic device 100, so that the touch screen is enabled for use as a viewfinder for still and/or video image acquisition. In some implementations, another image sensor 143 is located on the front of the electronic device 100 so that the user's image is obtained (e.g., for selfies, for videoconferencing while the user views the other video conference participants on the touch screen, etc.). In some implementations, the image sensor(s) are integrated within an HMD. For example, the image sensor(s) 143 output image data that represents a physical object (e.g., a physical agent) within a physical environment.

The contact intensity sensors 165 detect intensity of contacts on the electronic device 100 (e.g., a touch input on a touch-sensitive surface of the electronic device 100). The contact intensity sensors 165 are coupled with the intensity sensor controller 159 in the I/O subsystem 106. The contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). The contact intensity sensor(s) 165 receive contact intensity information (e.g., pressure information or a proxy for pressure information) from the physical environment. In some implementations, at least one contact intensity sensor 165 is collocated with, or proximate to, a touch-sensitive surface of the electronic device 100. In some implementations, at least one contact intensity sensor 165 is located on the side of the electronic device 100.

The eye tracking sensor(s) 164 detect an eye gaze of a user of the electronic device 100 and generate eye tracking data indicative of a gaze position of the user. In various implementations, the eye tracking data includes data indicative of a fixation point (e.g., point of regard) of the user on a display panel, such as a display panel within a head-mountable device (HMD), a head-mountable enclosure, or within a heads-up display.

The extremity tracking sensor 150 obtains extremity tracking data indicative of a position of an extremity of a user. For example, in some implementations, the extremity tracking sensor 150 corresponds to a hand tracking sensor that obtains hand tracking data indicative of a position of a hand or a finger of a user within a particular object. In some implementations, the extremity tracking sensor 150 utilizes computer vision techniques to estimate the pose of the extremity based on camera images.

In various implementations, the electronic device 100 includes a privacy subsystem 170 that includes one or more privacy setting filters associated with user information, such as user information included in extremity tracking data, eye gaze data, and/or body position data associated with a user. In some implementations, the privacy subsystem 170 selectively prevents and/or limits the electronic device 100 or portions thereof from obtaining and/or transmitting the user information. To this end, the privacy subsystem 170 receives user preferences and/or selections from the user in response to prompting the user for the same. In some implementations, the privacy subsystem 170 prevents the electronic device 100 from obtaining and/or transmitting the user information unless and until the privacy subsystem 170 obtains informed consent from the user. In some implementations, the privacy subsystem 170 anonymizes (e.g., scrambles or obscures) certain types of user information. For example, the privacy subsystem 170 receives user inputs designating which types of user information the privacy subsystem 170 anonymizes. As another example, the privacy subsystem 170 anonymizes certain types of user information likely to include sensitive and/or identifying information, independent of user designation (e.g., automatically).

Figure 2A:
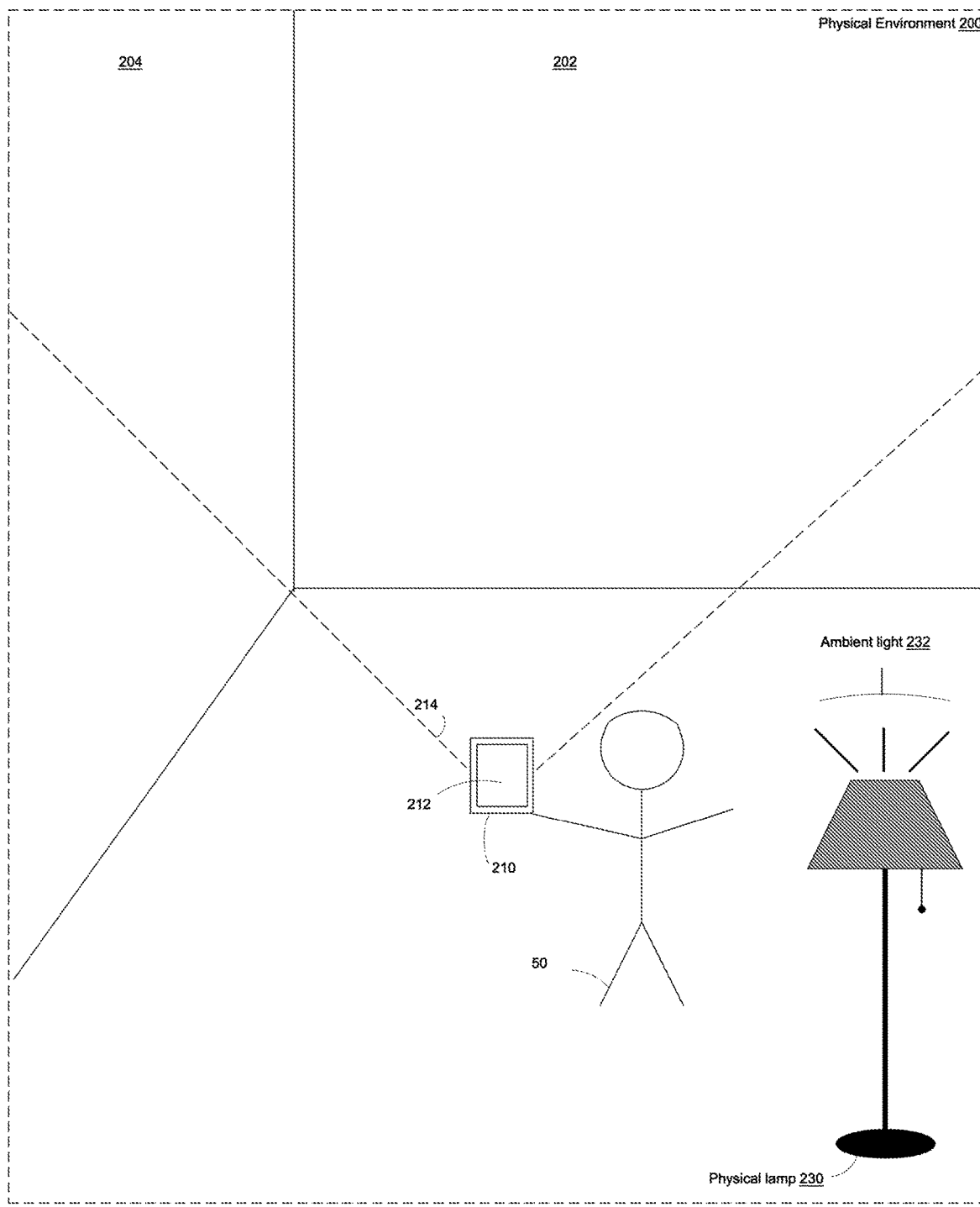

FIGS. 2A-2I are an example of generating shadows based on respective depth values and an SG lobe in accordance with some implementations. As illustrated in FIG. 2A, a physical environment 200 includes a first wall 202, a second wall 204, a physical lamp 230, and a user 50 holding an electronic device 210. The physical lamp 230 emits ambient light 232 within the physical environment 200. The electronic device 210 includes a display 212 that is associated with a viewable region 214 of the physical environment 200. The viewable region 214 includes a portion of the first wall 202 and a portion of the second wall 204.

In some implementations, the electronic device 210 corresponds to a head-mountable device (HMD) that includes an integrated display (e.g., a built-in display) that displays a representation of the physical environment 200. For example, the electronic device 210 displays, on the display 212, a computer-generated object that is overlaid on a portion of the physical environment 200. To that end, in some implementations, the electronic device 210 displays an XR environment. In some implementations, the electronic device 210 includes a head-mountable enclosure. In various implementations, the head-mountable enclosure includes an attachment region to which another device with a display can be attached. In various implementations, the head-mountable enclosure is shaped to form a receptacle for receiving another device that includes a display (e.g., the electronic device 210). For example, in some implementations, the electronic device 210 slides/snaps into or otherwise attaches to the head-mountable enclosure. In some implementations, the display of the device attached to the head-mountable enclosure presents (e.g., displays) the representation of the physical environment 200. For example, in some implementations, the electronic device 210 corresponds to a mobile phone that can be attached to the head-mountable enclosure.

In some implementations, the electronic device 210 includes an image sensor, such as a scene camera. For example, with references to FIGS. 2B and 2C, the electronic device 210 includes an image sensor 233. The image sensor 233 senses (e.g., captures) the ambient light 232 from the physical environment 200, and outputs image data 234 of the physical environment 200. The image data 234 may correspond to an image or a sequence of images (e.g., a video stream). According to various implementations, the electronic device 210 composites, via a compositing system 219, the image data 234 with various object renders in order to generate display data to be displayed on the display 212.

In some implementations, the electronic device 210 includes a see-through display. The see-through display permits ambient light from the physical environment 200 through the see-through display, and the representation of the physical environment is a function of the ambient light. In some implementations, the see-through display is an additive display that enables optical see-through of the physical surface, such as an optical HMD (OHMD). For example, unlike purely compositing using the image data 234, the see-through display is capable of reflecting projected images off of the display while enabling a user to see through the display.

Referring to FIG. 2B, the electronic device 210 renders, via a rendering system 216, a first computer-generated cube 240 (e.g., XR content) in order to generate a first cube render 242. For example, the rendering system 216 is integrated in a GPU. The rendering system 216 includes a depth value generator 217. While rendering the first-computer generated cube 240, the depth value generator 217 determines a first depth value 244 associated with the first-computer generated cube 240. For example, the first depth value 244 indicates a depth of the first-computer generated cube 240 within a scene, such that a higher depth value indicates that the first-computer generated cube 240 is positioned nearer to the background of the scene, and vice versa for a lower depth value. In some implementations, the electronic device 210 includes a depth buffer 218, and the electronic device 210 stores the first depth value 244 in the depth buffer 218. Utilization of the depth buffer 218 for generating shadows will be described with reference to FIGS. 2E and 2F. Moreover, in some implementations, the electronic device 210 includes a compositing system 219 that composites the image data 234 with the first cube render 242, in order to generate display data that is displayed on the display 212, as illustrated in FIG. 2D.

Referring to FIG. 2C, the electronic device 210 renders, via the rendering system 216, a second computer-generated cube 250 (e.g., XR content) in order to generate a second cube render 252. Rendering the second computer-generated cube 250 includes determining a second depth value 254 associated with the second computer-generated cube 250. The second depth value 254 is greater than the first depth value 244, as is illustrated in FIG. 2D. Moreover, the electronic device 210 stores the second depth value 254 in the depth buffer 218. The rendering system 216 may render the first computer-generated cube 240 and the second computer-generated cube 250 during a common rendering cycle, or during separate rendering cycles. Moreover, the compositing system 219 composites the image data 234 with the second cube render 252 in order to generate display data that is displayed on the display 212, as illustrated in FIG. 2D.

Figure 2D:
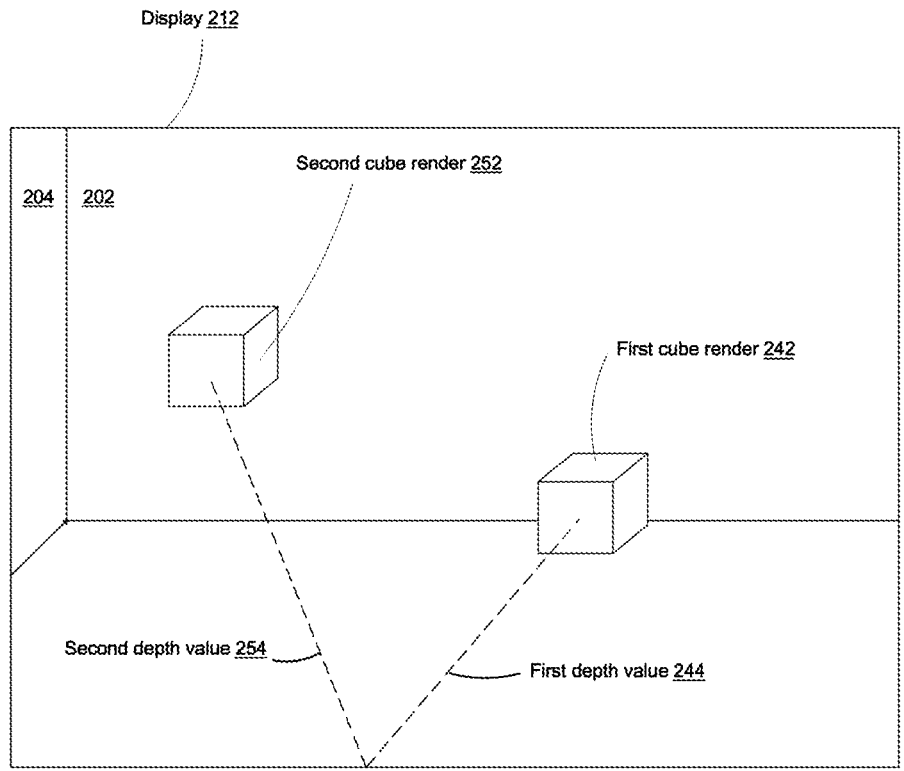

As illustrated in FIG. 2D, the electronic device 210 displays the display data on the display 212. The display data includes the first cube render 242 and the second cube render 252, composited with the image data 234. The image data 234 represents a portion of the physical environment 200. The portion of the physical environment 200 includes a portion of the first wall 202 and a portion of the second wall 204, based on the current viewable region 214. Accordingly, the first cube render 242 and the second cube render 252 appear as displayed overlaid respective portions of the physical environment 200.

The first depth value 244 and the second depth value 254 are illustrated in FIG. 2D for purely explanatory purposes. The first depth value 244 is less than the second depth value 254, and thus the first cube render 242 appears closer to the display 212 than does the second cube render 252. Accordingly, the first cube render 242 appears farther from the first wall 202 than does the second cube render 252.

Figure 2E:
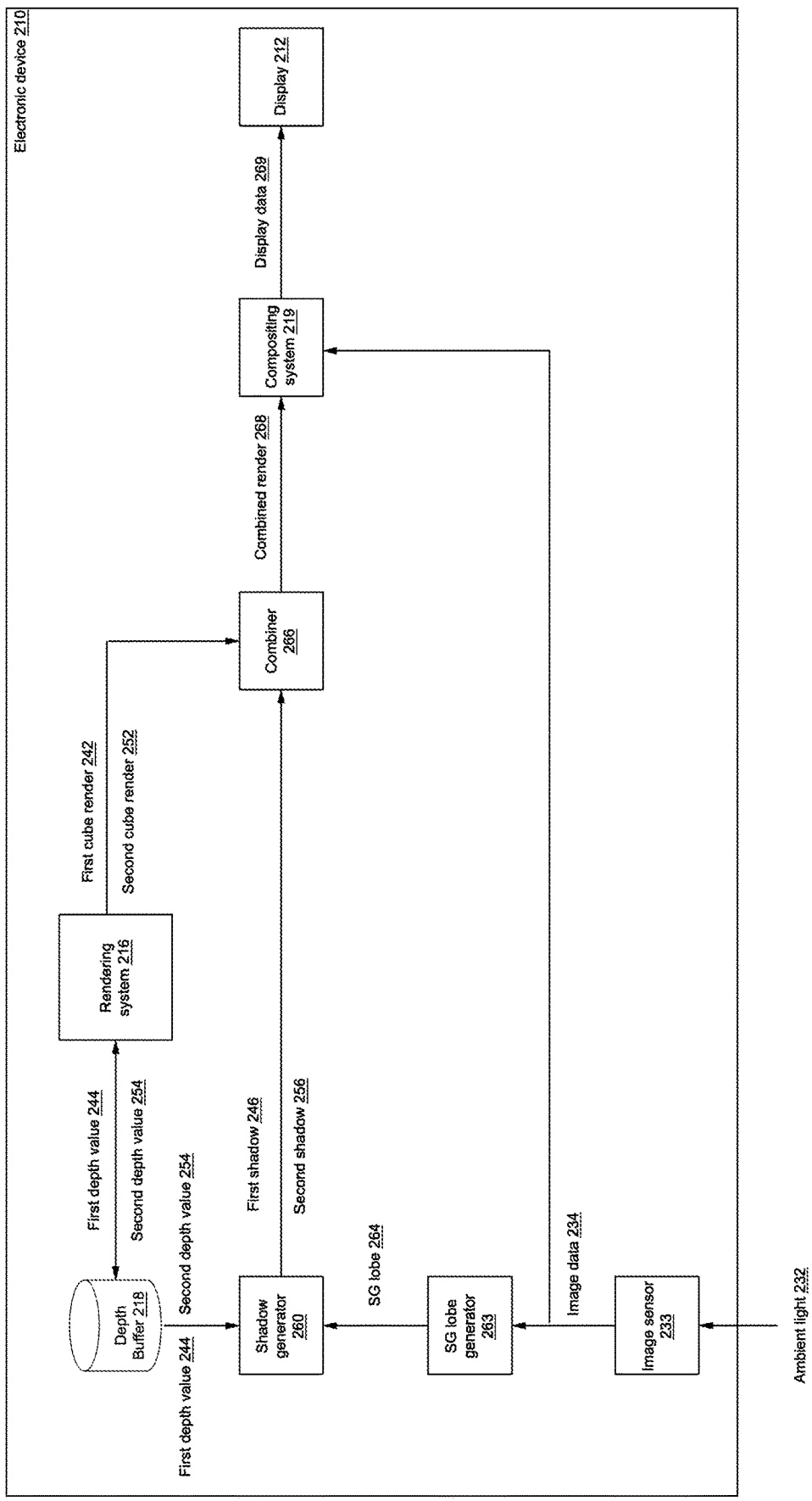

As illustrated in FIG. 2E, according to various implementations, the electronic device 210 includes components for generating and displaying a first shadow 246 and a second shadow 256. The first shadow 246 and the second shadow 256 are respectively associated with the first computer-generated cube 240 and the second computer-generated cube 250. Each of the first shadow 246 and the second shadow 256 is based on the ambient light 232, which is characterized by a Spherical Gaussian (SG) lobe 264. To that end, in some implementations, the electronic device 210 includes a shadow generator 260, an SG lobe generator 263, and a combiner 266.

The shadow generator 260 determines the first shadow 246 and the second shadow 256, based on the SG lobe 264 and respective depth values 244/254. The SG lobe 264 indicates a directional characteristic associated with the ambient light 232. Details regarding the shadow generator 260 determining the first shadow 246 and the second shadow 256 are described with reference to FIGS. 2F-2H. The SG lobe 264 is associated with a Spherical Gaussian (SG) function, which may be a standard Gaussian function defined on a surface of a sphere. For example, an SG function, denoted G (v; μ; λ; a), corresponds to: G (v; μ; λ; a)=$ae^{\lambda \cdot (\mu \cdot v - 1)}$ The SG function characterizes the ambient light 232, and the parameters (v; μ; λ; a) of the SG function affect the shape and location of the SG lobe 264. The parameter 'μ' corresponds to a unit vector that indicates the axis or direction associated with the SG lobe 264, such as a location of the SG lobe 264 on a surface of a sphere. For example, the parameter 'μ' indicates the directional characteristic associated with the ambient light 232. The parameter 'μ' may effectively point to the center of the SG lobe 264. In some implementations, the parameter 'μ' is represented by a three dimensional (3D) XYZ directional value. The parameter 'a' corresponds to the amplitude or intensity associated with the SG lobe 264. In some implementations, the amplitude is represented by a scalar value. In some implementations, the amplitude is represented by an RGB color value. The parameter 'λ' corresponds to the sharpness associated with the SG lobe 264. For example, a larger 'λ' value corresponds to a narrower SG lobe, resulting in a faster decrease from the axis associated with the SG lobe 264 (as compared with a smaller 'λ' value).

In various implementations, the SG lobe generator 263 generates the SG lobe 264 based on the image data 234. For example, in some implementations, the image data 234 corresponds to a 360 degree image of the physical environment 200, and the SG lobe generator 263 includes a neural network that determines the SG lobe 264 based on the 360 degree image.

The combiner 266 combines an object render with a corresponding shadow in order to generate a combined render 268. Namely, the combiner 266 combines the first cube render 242 with the first shadow 246, and combines the second cube render 252 with the second shadow 256, in order to generate the combined render 268. The compositing system 219 composites the combined render 268 with the image data 234 in order to generate display data 269. The display data 269 is displayed on the display 212, as illustrated in FIG. 2I.

Figure 2F:
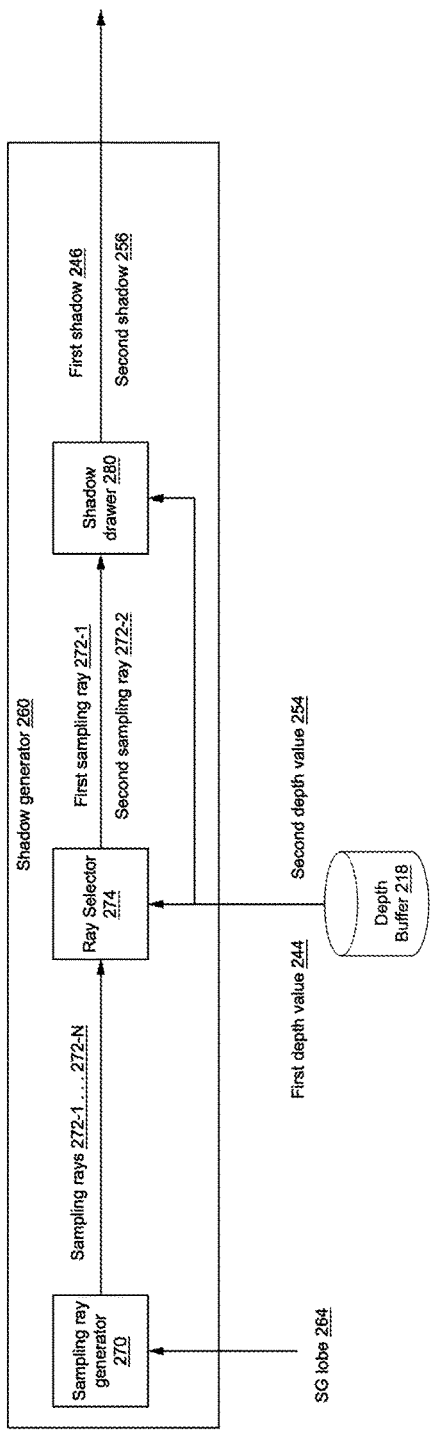

As illustrated in FIG. 2F, the shadow generator 260 determines the first shadow 246 and the second shadow 256, based on the SG lobe 264 and respective depth values 244/254. To that end, in some implementations, the shadow generator 260 includes a sampling ray generator 270, a ray selector 274, and a shadow drawer 280.

Figure 2G:
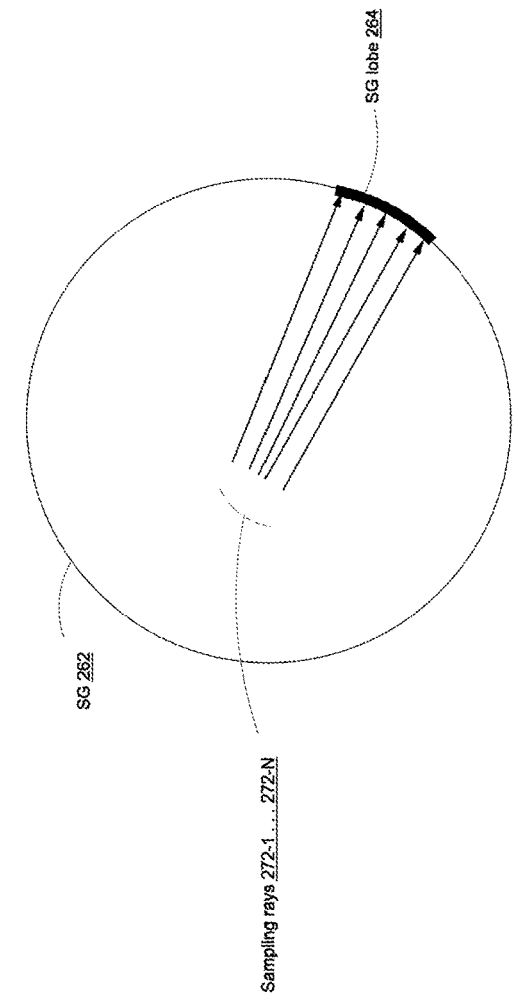

The sampling ray generator 270 obtains the SG lobe 264. A graphical representation of the SG lobe 264, on a corresponding SG 262, is illustrated in FIG. 2G. Referring back to FIG. 2A, the physical lamp 230 is positioned behind and to the right of the electronic device 210 within the physical environment 200. Accordingly, the directional characteristic associated with the SG lobe 264 (e.g., the position of the SG lobe 264) is also towards the bottom right of the SG 262, as illustrated in FIG. 2G. The sampling ray generator 270 determines a plurality of sampling rays 272-1, . . . , 272-N based on the directional characteristic. For example, as illustrated in FIG. 2G, each of the plurality of sampling rays 272-1, . . . , 272-N is substantially parallel to the SG lobe 264. One of ordinary skill in the art will appreciate that the number of the plurality of sampling rays 272-1, . . . , 272-N may vary according to different implementations. For example, the number of the plurality of sampling rays 272-1, . . . , 272-N is between 16 and 64.

Figure 2H:
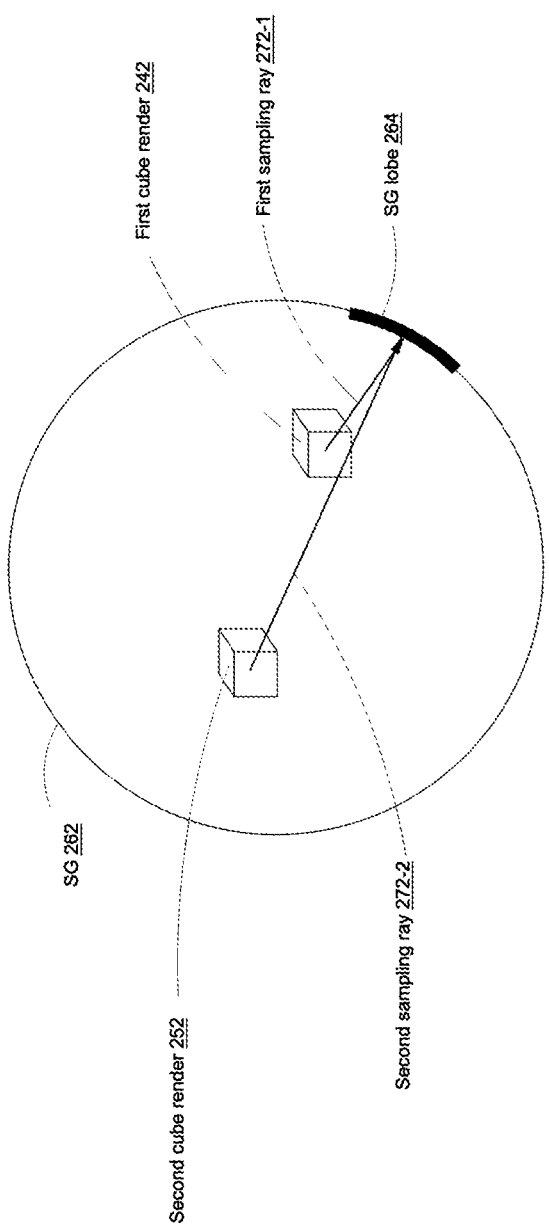
Figure 2I:
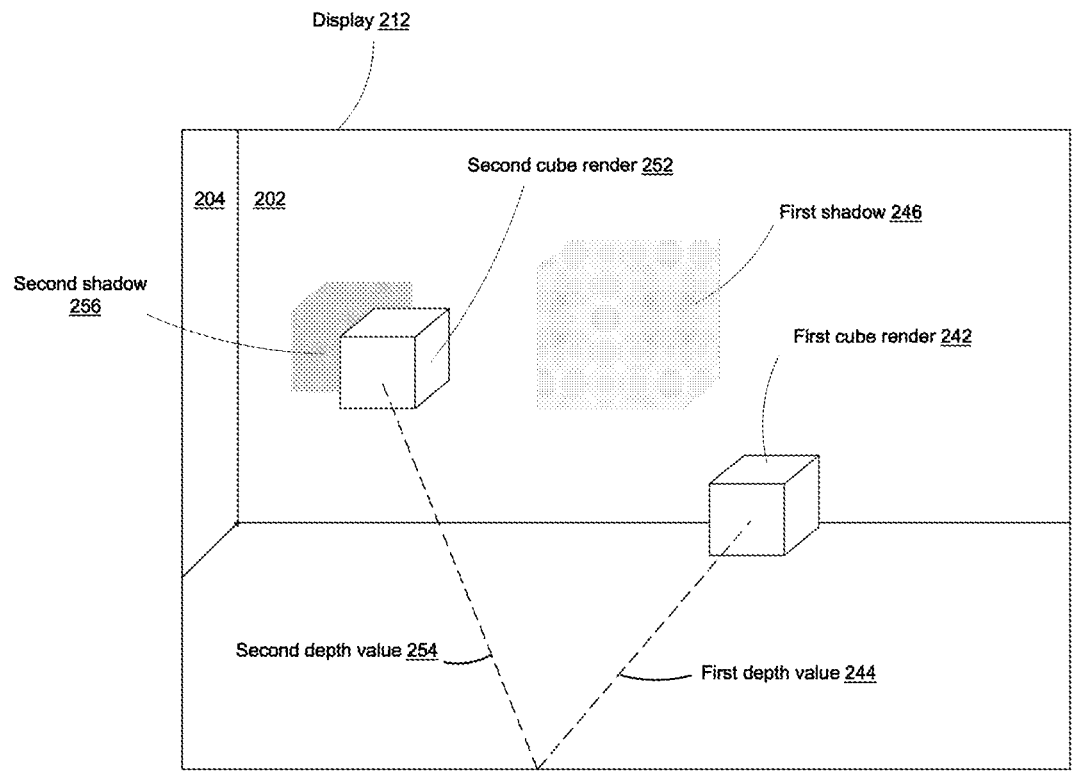

The ray selector 274 selects at least a portion of plurality of sampling rays 272-1, . . . , 272-N. For example, with reference to FIG. 2F, the ray selector 274 selects a first sampling ray 272-1 based on the first depth value 244, and selects a second sampling ray 272-2 based on the second depth value 254. As described with reference to FIGS. 2B and 2C, the electronic device 210 determines the first depth value 244 and the second depth value 254 during rendering of the first computer-generated cube 240 and the second computer-generated cube 250, respectively. Moreover, the electronic device 210 stores the first depth value 244 and the second depth value 254 in the depth buffer 218. During ray selection, the ray selector 274 obtains the first depth value 244 and the second depth value 254 from the depth buffer 218, and selects appropriate sampling rays based on the depth values. In some implementations, the selected portion of the plurality of sampling rays 272-1, . . . , 272-N and a corresponding object render together satisfy an occlusion criterion. For example, as illustrated in FIG. 2H and with reference back to FIG. 2D, the first sampling ray 272-1 and the first cube render 242 satisfy the occlusion criterion based on intersection between the first sampling ray 272-1 and the first cube render 242. Moreover, the second sampling ray 272-2 and the second cube render 252 satisfy the occlusion criterion based on intersection between the second sampling ray 272-2 and the second cube render 252.

The shadow drawer 280 generates the first shadow 246 (associated with the first computer-generated cube 240) based on the first sampling ray 272-1 and the first depth value 244. Moreover, the shadow drawer 280 generates the second shadow 256 (associated with the second computer-generated cube 250) based on the second sampling ray 272-2 and the second depth value 254. To that end, in some implementations, generating a shadow includes tracing one or more sampling ray(s) against a corresponding depth value. For example, the shadow drawer 280 traces the first sampling ray 272-1 against the first depth value 244 in order to generate the first shadow 246. As another example, the shadow drawer 280 traces the second sampling ray 272-2 against the second depth value 254 in order to generate the second shadow 256. Accordingly, in contrast to other systems that arbitrarily sample light rays (e.g., guess direction of the ambient light), the electronic device 210 uses the directional characteristic associated with the SG lobe 264 in order to efficiently trace sampling rays. The electronic device 210, therefore, performs fewer tracing operations in order to generate a photorealistic shadow.

As illustrated in FIG. 2I, the display 212 displays the first shadow 246 for the first cube render 242, and displays the second shadow 256 for the second cube render 252. The respective positions of the first shadow 246 and the second shadow 256 are based on the first sampling ray 272-1 and the second sampling ray 272-2. Because the second cube render 252 is nearer to the first wall 202, the second shadow 256 is smaller and has a sharper appearance, as compared with the first shadow 246. The difference in sharpness is indicated by different respective hatch patterns for the first shadow 246 and the second shadow 256.

Figure 3A:
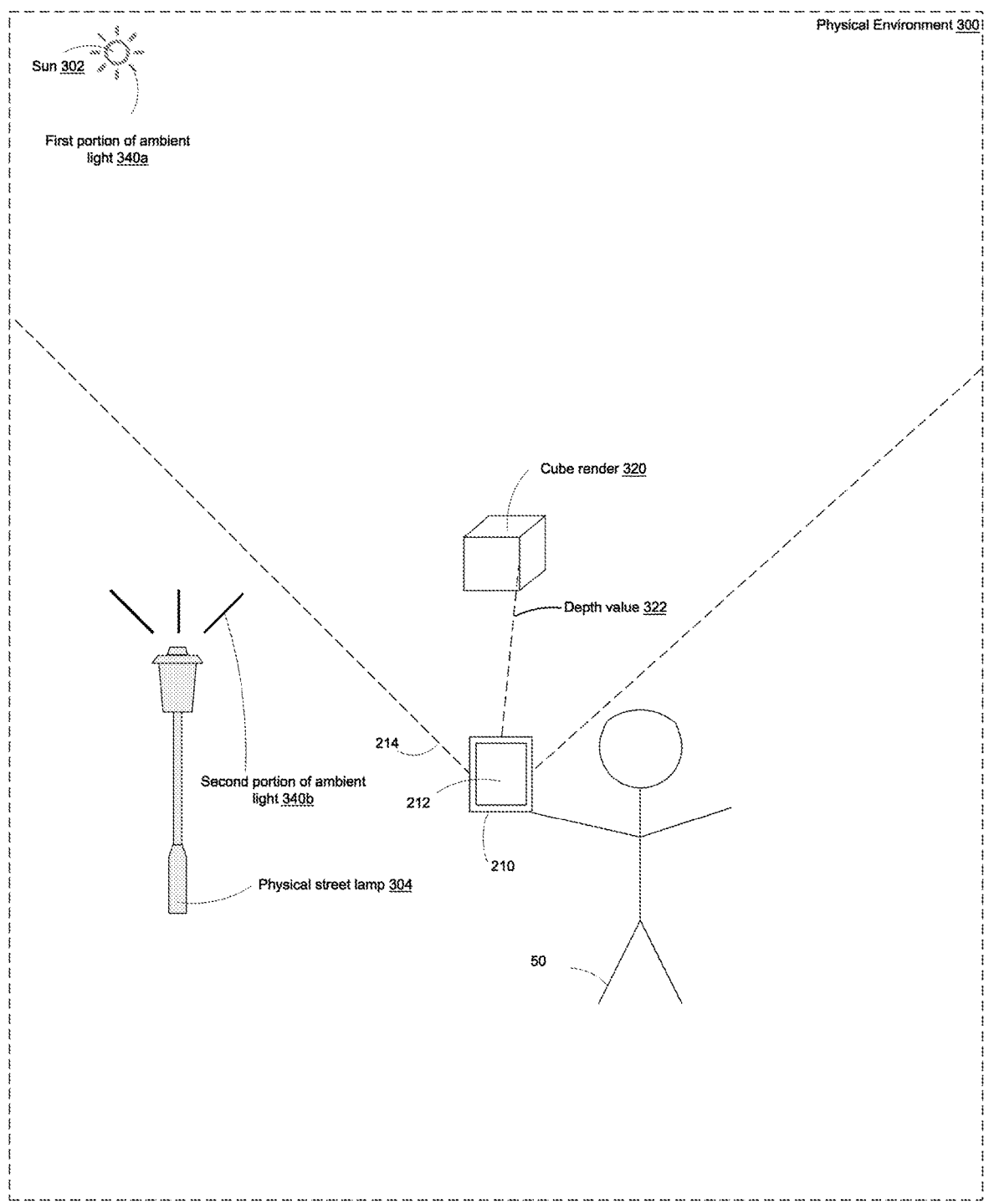

FIGS. 3A-3D are an example of utilizing a plurality of SG lobes for generating different shadows in accordance with some implementations. As illustrated in FIG. 3A, a physical environment 300 includes the user 50 holding the electronic device 210. The electronic device 210 is outside at daytime, and thus the physical environment 300 includes the Sun 302. The Sun 302 emits a first portion of ambient light 340a towards the electronic device 210. The physical environment 300 also includes a physical street lamp 304 that emits a second portion of ambient light 340b towards the electronic device 210. Because of the relative proximity of the physical street lamp 304 to the electronic device 210, the second portion of ambient light 340b is brighter (e.g., has a higher luminance) than the first portion of ambient light 340a from the Sun 302. Moreover, the electronic device 210 has rendered, via a rendering system, a computer-generated cube in order to generate a cube render 320, including determining a depth value 322 associated with the computer-generated cube. The display 212 displays the cube render 320, as shown in FIG. 3A.

As illustrated in FIGS. 3B and 3C, the electronic device 210 obtains a first SG lobe 332 of an SG 330, and obtains a second SG lobe 336 of the SG 330. The first SG lobe 332 characterizes the first portion of ambient light 340a from the Sun 302, and the second SG lobe 336 characterizes the second portion of ambient light 340b from the physical street lamp 304. The electronic device 210 determines, via the sampling ray generator 270, a first plurality of sampling rays associated with the first SG lobe 332, based on a first directional characteristic associated with the first SG lobe 332. Moreover, the electronic device 210 determines, via the sampling ray generator 270, a second plurality of sampling rays associated with the second SG lobe 336, based on a second directional characteristic associated with the second SG lobe 336.

In some implementations, the electronic device 210 selects, via the ray selector 274, a first portion 334 of the first plurality of sampling rays and a second portion 338 of the second plurality of sampling rays. In some implementations, the number of selected sampling rays is based on a corresponding intensity of the SG lobe, as indicated by a corresponding SG function. For example, as illustrated in FIGS. 3B and 3C, the second portion 338 of the second plurality of sampling rays includes more sampling rays than the first portion 334 of the first plurality of sampling rays, because the second portion of ambient light 340b from the physical street lamp 304 is more intense (e.g., brighter) than the first portion of ambient light 340a from the Sun 302.

Figure 3D:
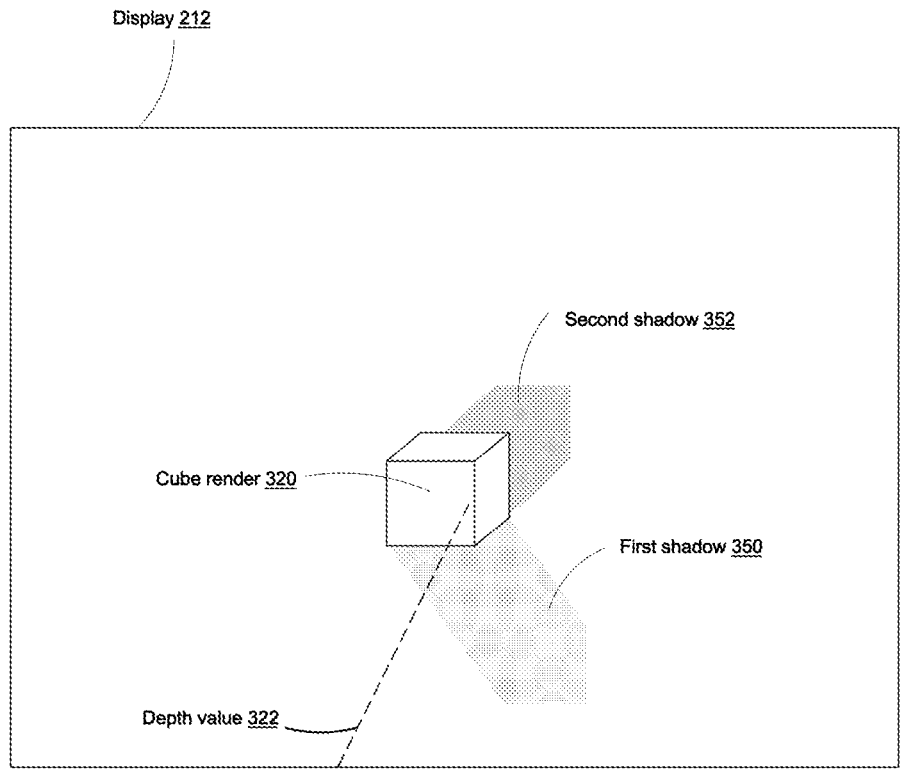

The electronic device 210 generates, via the shadow drawer 280, a first shadow 350 associated with the first portion of ambient light 340a, and a second shadow 352 associated with the second portion of ambient light 340b. The first shadow 350 is generated based on the depth value 322 and the first portion 334 of the first plurality of sampling rays. The second shadow 352 is generated based on the depth value 322 and the second portion 338 of the second plurality of sampling rays. For example, generating a particular shadow includes tracing respective sampling rays towards the cube render 320, based on a function of the depth value 322. As illustrated in FIG. 3D, the display 212 displays the cube render 320, the first shadow 350, and the second shadow 352. Because of the relatively high intensity of the second portion of ambient light 340b, the corresponding second shadow 352 is sharper than the first shadow 350, which is associated with the first portion of ambient light 340a. Additionally, the first shadow 350 is longer than the second shadow 352 because the Sun 302 is farther from the electronic device 210 than the physical street lamp 304 is from the electronic device 210.

Figure 4:
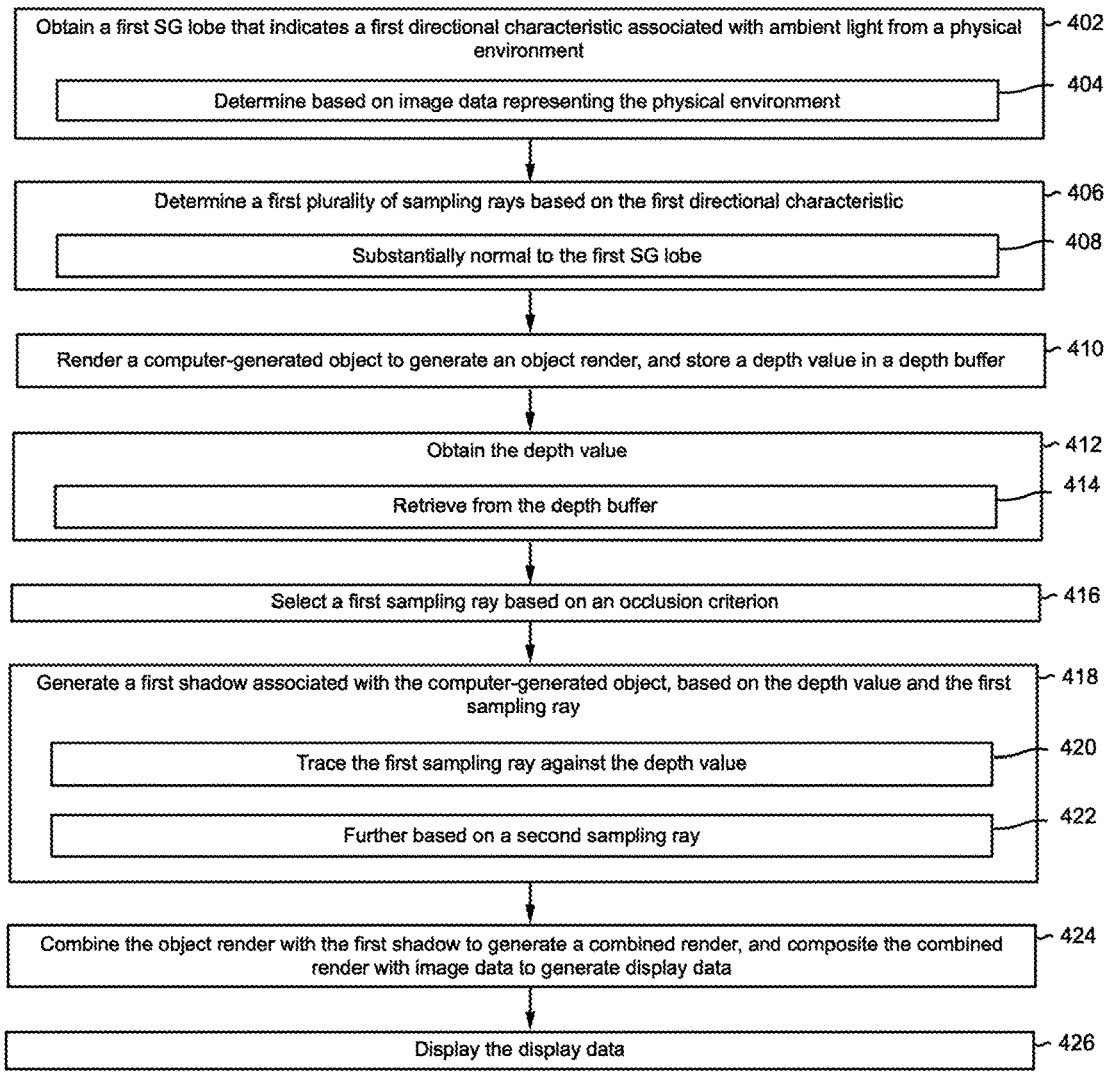
FIG. 4 is an example of a flow diagram of a method of generating a shadow based on an SG lobe and a depth value in accordance with some implementations.

FIG. 4 is an example of a flow diagram of a method 400 of generating a shadow based on an SG lobe and a depth value in accordance with some implementations. In various implementations, the method 400 or portions thereof are performed by an electronic device (e.g., the electronic device 210). In various implementations, the method 400 or portions thereof are performed by a mobile device, such as a smartphone, tablet, or wearable device. In various implementations, the method 400 or portions thereof are performed by a head-mountable device (HMD) including a display. In some implementations, the method 400 is performed by processing logic, including hardware, firmware, software, or a combination thereof. In some implementations, the method 400 is performed by a processor executing code stored in a non-transitory computer-readable medium (e.g., a memory).

As represented by block 402, the method 400 includes obtaining a first SG lobe that characterizes ambient light from a physical environment. The first SG lobe indicates a first directional characteristic associated with the ambient light. For example, with reference to FIGS. 2A and 2G, the electronic device 210 obtains the SG lobe 264, which is associated with the ambient light 232 produced by the physical lamp 230. In some implementations, the first SG lobe further indicates an intensity characteristic and/or a sharpness characteristic associated with the ambient light. In some implementations, the first SG lobe is characterized by an SG function $G(v; \mu; \lambda; a) = ae^{\lambda(\mu \cdot v - 1)}$.

As represented by block 404, in some implementations, obtaining the first SG lobe includes determining the first SG lobe based on image data that represents the physical environment. For example, with reference to FIGS. 2E, the image sensor 233 captures ambient light 232 from the physical environment 200, and outputs the image data 234 to the SG lobe generator 264, which determines the SG lobe 264 based on the image data 234. In some implementations, the image data includes a plurality of images associated with a plurality of poses. In some implementations, the image data includes a 360 degree image of the physical environment. For example, with reference to FIG. 2A, while the image sensor 233 is activated, the user 50 rotates the electronic device 210 in order to capture a 360 degree image of the physical environment 200.

As represented by block 406, the method 400 includes determining a first plurality of sampling rays based on the first directional characteristic. As represented by block 408, in some implementations, each of the plurality of sampling rays is substantially parallel to the first SG lobe. For example, with reference to FIGS. 2F and 2G, the sampling ray generator 270 determines a plurality of sampling rays 272-1, . . . , 272-N, based on a directional characteristic indicated by the SG lobe 264. Continuing with this example, the directional characteristic indicates a position of the SG lobe 264 on the SG 262. In some implementations, each of the first plurality of sampling rays is associated with a distinct position on the first SG lobe.

As represented by block 410, in some implementations, the method 400 includes rendering, via the rendering system, the computer-generated object in order to generate an object render. The rendering system may be integrated in a GPU. The computer-generated object may correspond to a 2D or a 3D object, such as an object model. Rendering the computer-generated object includes determining a depth value that is associated with the computer-generated object. Moreover, the method 400 may include storing the depth value in a depth buffer. For example, with reference to FIG. 2B, the rendering system 216, while rendering the first computer-generated cube 240, determines the first depth value 244. Moreover, the electronic device 210 stores the first depth value 244 in the depth buffer 218.

As represented by block 412, the method 400 includes obtaining the depth value that is associated with the computer-generated object. As represented by block 414, in some implementations, obtaining the depth value includes retrieving the depth value from the depth buffer. For example, with reference to FIG. 2E, the shadow generator 260 obtains the first depth value 244 from the depth buffer 218. Accordingly, an electronic device retrieves the depth value that is determined as part of the standard rendering process. Retrieving the depth value from the depth buffer enables an electronic device to avoid performing additional depth information calculations, such as a determination of a 3D mesh performed by other systems.

As represented by block 416, in some implementations, the method 400 includes selecting a first sampling ray of the first plurality of sampling rays according to a determination that the first sampling ray and the object render together satisfy an occlusion criterion. For example, with reference to FIGS. 2D and 2H, the first sampling ray 272-1 and the first cube render 242 satisfy the occlusion criterion based on intersection between the first sampling ray 272-1 and the first cube render 242.

As represented by block 418, the method 400 includes generating a first shadow that is associated with the computer-generated object, based on the depth value and a first sampling ray of the first plurality of sampling rays. To that end, in some implementations, the method 400 includes tracing the first sampling ray against the depth value, as represented by block 420. In other words, the depth value may be used as a proxy for tracing the first sampling ray. For example, with reference to FIGS. 2H and 2I, the electronic device 210 uses the first sampling ray 272-1 and the first depth value 244 in order to generate and display display data that includes a first shadow 246. The first shadow 246 represents a real-world shadow that would be cast by a physical approximation of the first computer-generated cube 240, such as a physical cube. Details regarding generation of the display data are described with reference to blocks 424 and 426. As represented by block 422, in some implementations, generating the first shadow is further based on a second sampling ray of the first plurality of sampling rays.

As represented by block 424, in some implementations, the method 400 includes combining the object render with the first shadow in order to generate a combined render, and compositing the combined render with image data of the physical environment in order to generate the display data. For example, with reference to FIG. 2E, the combiner 266 combines first and second cube renders 242 and 252 with respective first and second shadows 246 and 256, in order to generate the combined render 268. Moreover, the compositing system 219 composites the combined render 268 with the image data 234 in order to generate the display data 269. As represented by block 426, in some implementations, the method 400 includes displaying the display data on a display, such as on the display 212 illustrated in FIG. 2I.

Figure 5:
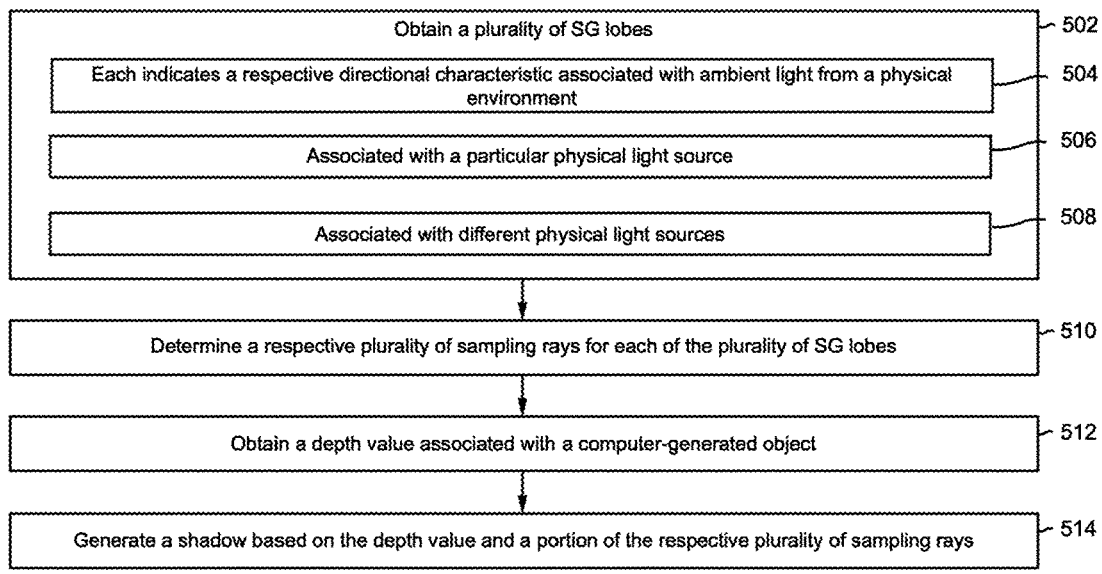
FIG. 5 is an example of a flow diagram of a method of generating a shadow based on a plurality of SG lobes and a depth value in accordance with some implementations.

FIG. 5 is an example of a flow diagram of a method 500 of generating a shadow based on a plurality of SG lobes and a depth value in accordance with some implementations. In various implementations, the method 500 or portions thereof are performed by an electronic device (e.g., the electronic device 210). In various implementations, the method 500 or portions thereof are performed by a mobile device, such as a smartphone, tablet, or wearable device. In various implementations, the method 500 or portions thereof are performed by an HMD including a display. In some implementations, the method 500 is performed by processing logic, including hardware, firmware, software, or a combination thereof. In some implementations, the method 500 is performed by a processor executing code stored in a non-transitory computer-readable medium (e.g., a memory).

As represented by block 502, in some implementations, the method 500 includes obtaining a plurality of SG lobes. In some implementations, as represented by block 504, each of the plurality of SG lobes indicates a respective directional characteristic associated with ambient light from a physical environment.

As represented by block 506, in some implementations, the plurality of SGlobes may be associated with a particular physical light source. For example, the method 500 includes obtaining a first SG lobe that characterizes a first portion of ambient light produced by a particular physical light source, and obtaining a second SG lobe that characterizes a second portion of the ambient light produced by the particular physical light source. Continuing with this example, the first SG lobe indicates a first directional characteristic, and the second SG lobe indicates a second directional characteristic that is different from the first directional characteristic. The number of SG lobes associated with a particular physical light source may be proportional to the complexity of the particular physical light source.

As another example, as represented by block 508, the plurality of SG lobes may be associated with different physical light sources. Because each of the plurality of SG lobes is localized, each SG lobe may quantify a different physical light source. Moreover, the amplitude (e.g., RGB value) and sharpness value associated with a particular SG lobe can be independently adjusted. For example, with reference to FIGS. 3A-3C, the first SG lobe 332 characterizes the first portion of the ambient light 340*a* from the Sun 302, and the second SG lobe 336 characterizes the second portion of the ambient light 340*b* from the physical street lamp 304. Accordingly, in some implementations, each of the plurality of SG lobes characterizes a distinct physical light source. In some implementations, each of a plurality of physical light sources is characterized by multiple SG lobes. In some implementations, the method 500 includes obtaining a single SG lobe for a less complex light source, and multiple SG lobes for a more complex light source.

As represented by block 510, in some implementations, the method 500 includes determining a respective plurality of sampling rays for each of the plurality of SG lobes. In some implementations, the number of a plurality of sampling rays for a particular SG lobe is proportional to an intensity characteristic indicated by the particular SG lobe. In other words, more sampling rays may be used for a brighter physical light source. For example, an electronic device determines 16 sampling rays based on a first SG lobe associated with the Sun, and determines 64 sampling rays based on a second SG lobe associated with a physical fluorescent lamp. In some implementations, the number of a plurality of sampling rays for a particular SG lobe is based on a sharpness or softness characteristic indicated by a particular SG lobe. For example, the method 500 utilizes fewer sampling rays for a narrower (e.g., sharper) SG lobe than for a wider SG lobe, because the narrower SG lobe is associated with a sharper shadow boundary. The width of a penumbra associated with a particular SG lobe is based on geometry involved in the light transport. For example, the width of a penumbra is based on the size of a physical light source, and the distances between the light, the occluder, and physical surface on which a shadow is cast. In some implementations, the number of a plurality of sampling rays for a particular SG lobe is based on a combination of an intensity characteristic indicated by a particular SG lobe, and a sharpness/softness characteristic indicated by the particular SG lobe.

As represented by block 512, the method 500 includes obtaining the depth value that is associated with a computer-generated object, such as is described with reference to block 412. As represented by block 514, the method 500 includes generating a shadow that is associated with the computer-generated object, based on a portion of the respective plurality of sampling rays. For example, with reference to FIGS. 3B and 3C, the electronic device 210 selects three sampling rays based on the first SG lobe 332, and selects six sampling rays based on the second SG lobe 336. Accordingly, with reference to FIG. 3D, the electronic device 210 generates the first shadow 350 based on the three sampling rays, and generates the second shadow 352 based on the six sampling rays.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional sub-components to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be implemented in such program instructions, although some or all of the disclosed functions may alternatively be implemented in application-specific circuitry (e.g., ASICs or FPGAs or GP-GPUs) of the computer system. Where the computer system includes multiple computing devices, these devices may be co-located or not co-located. The results of the disclosed methods and tasks may be persistently stored by transforming physical storage devices, such as solid-state memory chips and/or magnetic disks, into a different state.

Various processes defined herein consider the option of obtaining and utilizing a user's personal information. For example, such personal information may be utilized in order to provide an improved privacy screen on an electronic device. However, to the extent such personal information is collected, such information should be obtained with the user's informed consent. As described herein, the user should have knowledge of and control over the use of their personal information.

Personal information will be utilized by appropriate parties only for legitimate and reasonable purposes. Those parties utilizing such information will adhere to privacy policies and practices that are at least in accordance with appropriate laws and regulations. In addition, such policies are to be well-established, user-accessible, and recognized as in compliance with or above governmental/industry standards. Moreover, these parties will not distribute, sell, or otherwise share such information outside of any reasonable and legitimate purposes.

Users may, however, limit the degree to which such parties may access or otherwise obtain personal information. For instance, settings or other preferences may be adjusted such that users can decide whether their personal information can be accessed by various entities. Furthermore, while some features defined herein are described in the context of using personal information, various aspects of these features can be implemented without the need to use such information. As an example, if user preferences, account names, and/or location history are gathered, this information can be obscured or otherwise generalized such that the information does not identify the respective user.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various implementations described above can be combined to provide further implementations. Accordingly, the novel methods and systems described herein may be implemented in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed:

1. A method comprising:
    at an electronic device including one or more processors and a non-transitory memory:
    obtaining a first spherical Gaussian (SG) lobe that characterizes ambient light from a physical environment, wherein the first SG lobe indicates a first directional characteristic associated with the ambient light;
    determining a first plurality of sampling rays based on the first directional characteristic;
    obtaining a depth value that is associated with a computer-generated object; and
    generating a first shadow that is associated with the computer-generated object, based on the depth value and a first sampling ray of the first plurality of sampling rays.

2. The method of claim 1, wherein the first SG lobe is characterized by an SG function corresponding to G (v; μ; λ; a)=$ae^{\lambda(\mu \cdot v - 1)}$.

3. The method of claim 1, further comprising:
    obtaining image data that represents the physical environment; and
    determining the first SG lobe based on the image data.

4. The method of claim 3, wherein the image data includes a plurality of images associated with a plurality of poses.

5. The method of claim 3, wherein the image data includes a 360 degree image of the physical environment.

6. The method of claim 1, wherein each of the first plurality of sampling rays is associated with a distinct position within the first SG lobe.

7. The method of claim 1, wherein each of the first plurality of sampling rays is substantially parallel to the first SG lobe.

8. The method of claim 1, wherein the number of the first plurality of sampling rays is proportional to an intensity characteristic indicated by the first SG lobe.

9. The method of claim 1, wherein the number of the first plurality of sampling rays is based on a sharpness characteristic indicated by the first SG lobe.

10. The method of claim 1, wherein generating the first shadow includes tracing the first sampling ray against the depth value.

11. The method of claim 1, wherein the electronic device includes a rendering system and a depth buffer, the method further comprising:
    rendering, via the rendering system, the computer-generated object in order to generate an object render, wherein the rendering includes determining the depth value; and
    storing the depth value in the depth buffer.

12. The method of claim 11, wherein generating the first shadow includes retrieving the depth value from the depth buffer.

13. The method of claim 11, further comprising selecting the first sampling ray according to a determination that the first sampling ray and the object render together satisfy an occlusion criterion.

14. The method of claim 11, further comprising:
    combining the object render with the first shadow in order to generate a combined render;
    compositing the combined render with image data of the physical environment, in order to generate display data; and
    displaying the display data on a display.

15. The method of claim 1, wherein generating the first shadow is further based on a second sampling ray of the first plurality of sampling rays.

16. The method of claim 1, further comprising:
    obtaining a second SG lobe that characterizes the ambient light from the physical environment, wherein the second SG lobe indicates a second directional characteristic associated with the ambient light, and wherein the first directional characteristic is different from the second directional characteristic; and
    determining a second plurality of sampling rays based on the second directional characteristic;
    wherein generating the first shadow is further based on a first sampling ray of the second plurality of sampling rays.

17. The method of claim 1, wherein the first directional characteristic is associated with a first portion of the ambient light from a first physical light source, the method further comprising:
    obtaining a second SG lobe that characterizes the ambient light from the physical environment, wherein the second SG lobe indicates a second directional characteristic associated with the ambient light, and wherein the second directional characteristic is associated with a second portion of the ambient light from a second physical light source that is different from the first physical light source;

determining a second plurality of sampling rays based on the second directional characteristic; and generating a second shadow that is associated with the computer-generated object, based on the depth value and a first sampling ray of the second plurality of sampling rays.

18. An electronic device comprising:

a sampling ray generator to:
    obtain a first SG lobe that characterizes ambient light from a physical environment, wherein the first SG lobe indicates a first directional characteristic associated with the ambient light; and
    determine a first plurality of sampling rays based on the first directional characteristic; and a shadow drawer to:
    obtain a depth value that is associated with a computer-generated object; and
    determine a first shadow that is associated with the computer-generated object, based on the depth value and a first sampling ray, of the first plurality of sampling rays, from the sampling ray generator.

19. The electronic device of claim 18, wherein the electronic device further comprises:
    a rendering system to render the computer-generated object in order to determine the depth value; and
    a depth buffer to store the depth value.

20. The electronic device of claim 19, wherein the shadow drawer obtains the depth value from the depth buffer.

21. A non-transitory computer readable storage medium storing one or more programs, the one or more programs comprising instructions, which, when executed by an electronic device, cause the electronic device to:

obtain a first SG lobe that characterizes ambient light from a physical environment, wherein the first SG lobe indicates a first directional characteristic associated with the ambient light;

determine a first plurality of sampling rays based on the first directional characteristic;

obtain a depth value that is associated with a computer-generated object; and generate a first shadow that is associated with the computer-generated object, based on the depth value and a first sampling ray of the first plurality of sampling rays.

* * * * *